United States Patent
van Meurs (10) Patent No.: US 11,782,126 B2
(45) Date of Patent: Oct. 10, 2023

(54) SYSTEM AND METHOD FOR AUTOMOTIVE RADAR SENSOR ORIENTATION ESTIMATION USING RADAR DETECTION INFORMATION OF ARBITRARY DETECTIONS

(71) Applicant: NXP B.V., Eindhoven (NL)

(72) Inventor: Lars van Meurs, Eindhoven (NL)

(73) Assignee: NXP B.V., Eindhoven (NL)

(*) Notice: Subject to any disclaimer, the term of this patent is extended or adjusted under 35 U.S.C. 154(b) by 319 days.

(21) Appl. No.: 17/184,468

(22) Filed: Feb. 24, 2021

(65) Prior Publication Data
US 2022/0268887 A1    Aug. 25, 2022

(51) Int. Cl.
G01S 7/40      (2006.01)
G01S 13/60     (2006.01)
G01S 13/931    (2020.01)

(52) U.S. Cl.
CPC .............. *G01S 7/4026* (2013.01); *G01S 7/40* (2013.01); *G01S 13/60* (2013.01); *G01S 7/403* (2021.05); *G01S 13/931* (2013.01)

(58) Field of Classification Search
CPC .......... G01S 7/40; G01S 7/4026; G01S 7/403; G01S 7/4034; G01S 13/60; G01S 13/87; G01S 13/931
See application file for complete search history.

(56) References Cited

U.S. PATENT DOCUMENTS

| | | | | |
|---|---|---|---|---|
| 5,977,906 A * | 11/1999 | Ameen | ................. | G01S 13/931 342/174 |
| 6,900,755 B2 * | 5/2005 | Richardson | ........... | G01S 7/4026 342/107 |
| 7,443,335 B2 * | 10/2008 | Kai | ........................ | G01S 13/931 342/147 |
| 10,656,246 B2 * | 5/2020 | Marsch | ................. | G01S 13/723 |
| 11,592,545 B2 * | 2/2023 | Cieslar | .................. | G01S 13/931 |

(Continued)

FOREIGN PATENT DOCUMENTS

| | | |
|---|---|---|
| DE | 102011015935 A1 | 10/2012 |
| DE | 102015012246 A1 | 3/2016 |

(Continued)

OTHER PUBLICATIONS

Kellner et al., "Instantaneous Ego-Motion Estimation using Doppler Radar," Proceedings of 16th Int'l IEEE Annual Conf. on Intelligent Transportation Systems (Oct. 2013), pp. 869-875.

(Continued)

*Primary Examiner* — Peter M Bythrow (57) ABSTRACT

A mechanism is provided for estimating mounting orientation yaw and pitch of a radar sensor without need of prior knowledge or information from any other sensor on an automobile. Embodiments estimate the sensor heading (e.g., azimuth) due to movement of the automobile from radial relative velocities and azimuths of radar target detections. This can be performed at every system cycle, when a new radar detection occurs. Embodiments then can estimate the sensor mounting orientation (e.g., yaw) from multiple sensor heading estimations. For further accuracy, embodiments can also take into account target elevation measurements to either more accurately determine sensor azimuth and yaw or to also determine mounting pitch orientation.

18 Claims, 6 Drawing Sheets

(56) References Cited

U.S. PATENT DOCUMENTS

| | | | | |
|---|---|---|---|---|
| 2013/0088382 | A1* | 4/2013 | Lee | G01S 7/4026 |
| | | | | 342/174 |
| 2015/0070207 | A1* | 3/2015 | Millar | G01S 13/4454 |
| | | | | 342/174 |
| 2017/0124781 | A1* | 5/2017 | Douillard | G01S 17/931 |
| 2017/0212215 | A1* | 7/2017 | Hellinger | G01S 13/931 |
| 2017/0261599 | A1* | 9/2017 | Zeng | G01S 7/4026 |
| 2018/0024228 | A1* | 1/2018 | Schiffmann | G01S 13/86 |
| | | | | 342/174 |
| 2020/0003868 | A1* | 1/2020 | Yan | G01S 13/931 |
| 2020/0011970 | A1* | 1/2020 | Abari | G01S 13/931 |
| 2020/0124716 | A1* | 4/2020 | Millar | G01S 13/726 |
| 2020/0191938 | A1* | 6/2020 | Green | G01S 13/62 |
| 2020/0309937 | A1* | 10/2020 | Buddendick | G01S 7/4026 |
| 2020/0333436 | A1* | 10/2020 | Insana | G01S 13/449 |
| 2020/0393540 | A1* | 12/2020 | Bialer | G01S 7/4026 |
| 2020/0400814 | A1* | 12/2020 | Gustafsson | G01S 7/40 |
| 2021/0124033 | A1* | 4/2021 | Ziegler | G01S 7/4972 |
| 2021/0124034 | A1* | 4/2021 | Ziegler | G01S 17/931 |

FOREIGN PATENT DOCUMENTS

| | | | |
|---|---|---|---|
| DE | 102015116441 | A1 | 3/2017 |
| EP | 3104189 | A1 | 12/2016 |
| EP | 3136123 | A1 | 3/2017 |

OTHER PUBLICATIONS

Kellner et al., "Joint Radar Alignment and Odometry Calibration," 18th Int'l Conf. on Information Fusion (Jul. 2015), pp. 366-374.

* cited by examiner

SYSTEM AND METHOD FOR AUTOMOTIVE RADAR SENSOR ORIENTATION ESTIMATION USING RADAR DETECTION INFORMATION OF ARBITRARY DETECTIONS

BACKGROUND

Field

This disclosure relates generally to radar systems and associated methods of operation, and more specifically, to determining a radar sensor mounting orientation using only radar detection information of arbitrary detections.

Related Art

Radar systems are used to detect the range, velocity, and angle of nearby targets. With advances in technology, radar systems can now be applied in many different applications, such as automotive radar safety systems, but not every radar system is suitable for every application. For example, 77 GHz Frequency Modulation Continuous Wave (FMCW) Fast Chirp Modulation (FCM) radars are used with multiple-input, multiple-output (MIMO) arrays as sensors in Advanced Driver Assistance System (ADAS) and autonomous driving (AD) systems.

Automotive radar sensors provide information regarding a vehicle's environment. Without knowledge about the radar's mounting or input from other sensors, the environmental information is relative to the radar's mounting position and orientation. In order to determine positions of detected target objects from the perspective of the vehicle, the radar sensor's mounting position (x,y,z) and orientation (yaw, roll, and pitch) should be known. Radar measurements are sensitive to mounting orientation yaw and pitch, because a relatively small error in those quantities can result in a large positional offset at long distances.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Embodiments of the present invention provide a mechanism for estimating mounting orientation yaw and pitch of a radar sensor without need of prior knowledge or information from any other sensor on an automobile. Embodiments estimate the sensor heading (e.g., azimuth) due to movement of the automobile from radial relative velocities and azimuths of radar target detections. This can be performed at every system cycle, when a new radar detection occurs. Embodiments then can estimate the sensor mounting orientation (e.g., yaw) from multiple sensor heading estimations. For further accuracy, embodiments can also take into account target elevation measurements to either more accurately determine sensor azimuth and yaw or to also determine mounting pitch orientation.

Estimation of radar sensor mounting yaw and pitch are useful for mounting orientation calibration of the radar and commissioning of radar sensors. Mounting orientation calibration is used when the radar sensor mounting orientation is not known or when the mounting orientation is only known approximately. The radar sensor can be mounted with a fixed predefined mounting orientation on the vehicle. But in practice there can be an offset with respect to the predefined mounting orientation. This offset can also change in time (e.g., due to expanding and contracting materials or due to a repair to the vehicle after an accident). In addition, when new radar sensors are mounted to a vehicle, estimation of mounting orientation can be used to identify each radar sensor by comparing the mounting orientation to approximate predefined mounting orientations.

Embodiments perform mounting orientation yaw and pitch estimation without need for knowledge about the vehicle on which the radar sensor is mounted, knowledge of the environment surrounding the vehicle, or need for an additional sensor such as an inertial measurement unit or a speed sensor. Further, embodiments can perform these tasks during normal operation in typical automotive environments on arbitrary detections, which cannot be done by prior devices. The estimation does not need association of detections from measurements at different time instances (e.g., tracking detections) like other prior methods.

Figure 1:
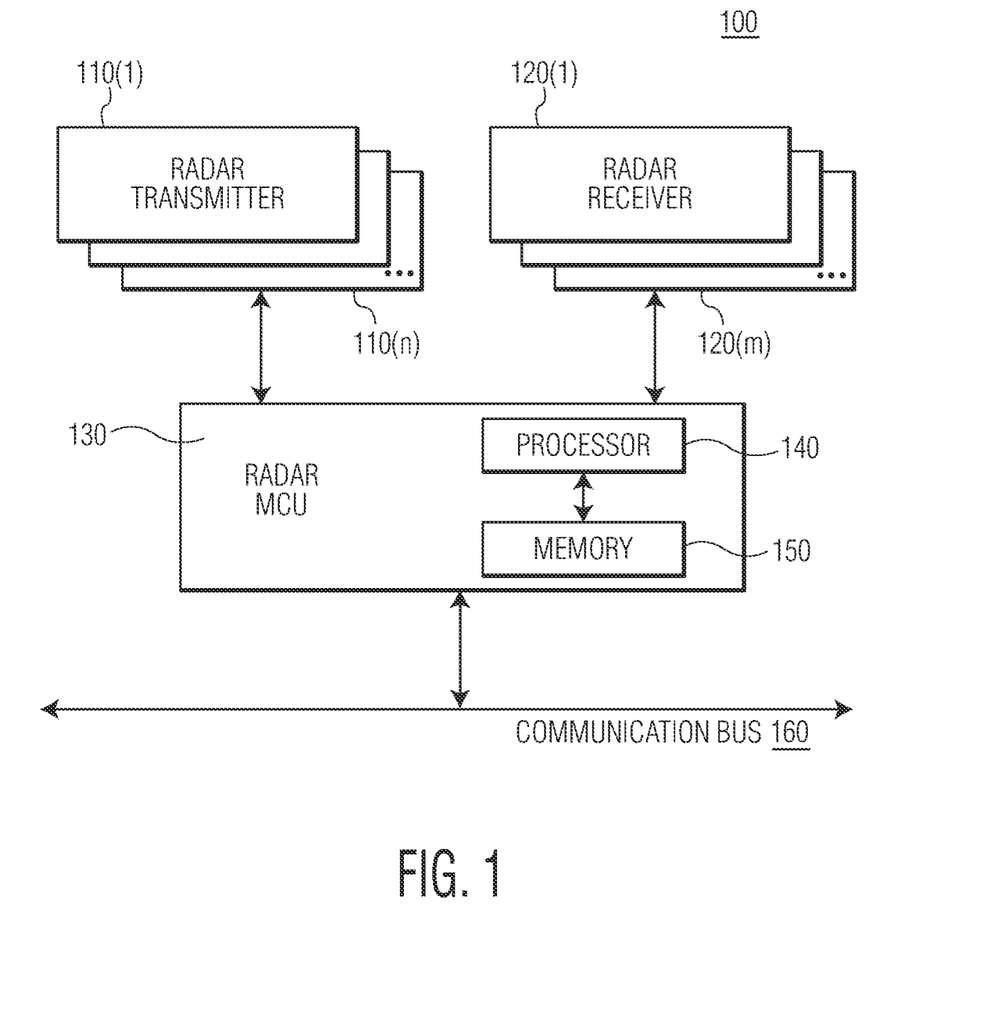
FIG. 1 is a simplified block diagram illustrating an automotive radar system 100 that includes one or more radar transmitters for transmitting radar chirp signals and one or more radar receivers for receiving radar signals reflected by target objects.

FIG. 1 is a simplified block diagram illustrating an automotive radar system 100 that includes one or more radar transmitters 110(1)-(n) for transmitting radar chirp signals and one or more radar receivers 120(1)-(m) for receiving radar signals reflected by target objects. Radar system 100 further includes a radar microcontroller unit (radar MCU) 130 that is connected to the radar transmitters and receivers. Radar MCU 130 can include one or more processors 140 configured to execute program code stored in a memory 150. Memory 150 can take the form of a non-transitory computer readable memory that can store operating system software, applications, instructions, and data, and combinations thereof. Radar MCU 130 is configured to execute a program or algorithm to determine alignment of the radar system 100 in accord with embodiments of the present invention as described below.

Figure 2:
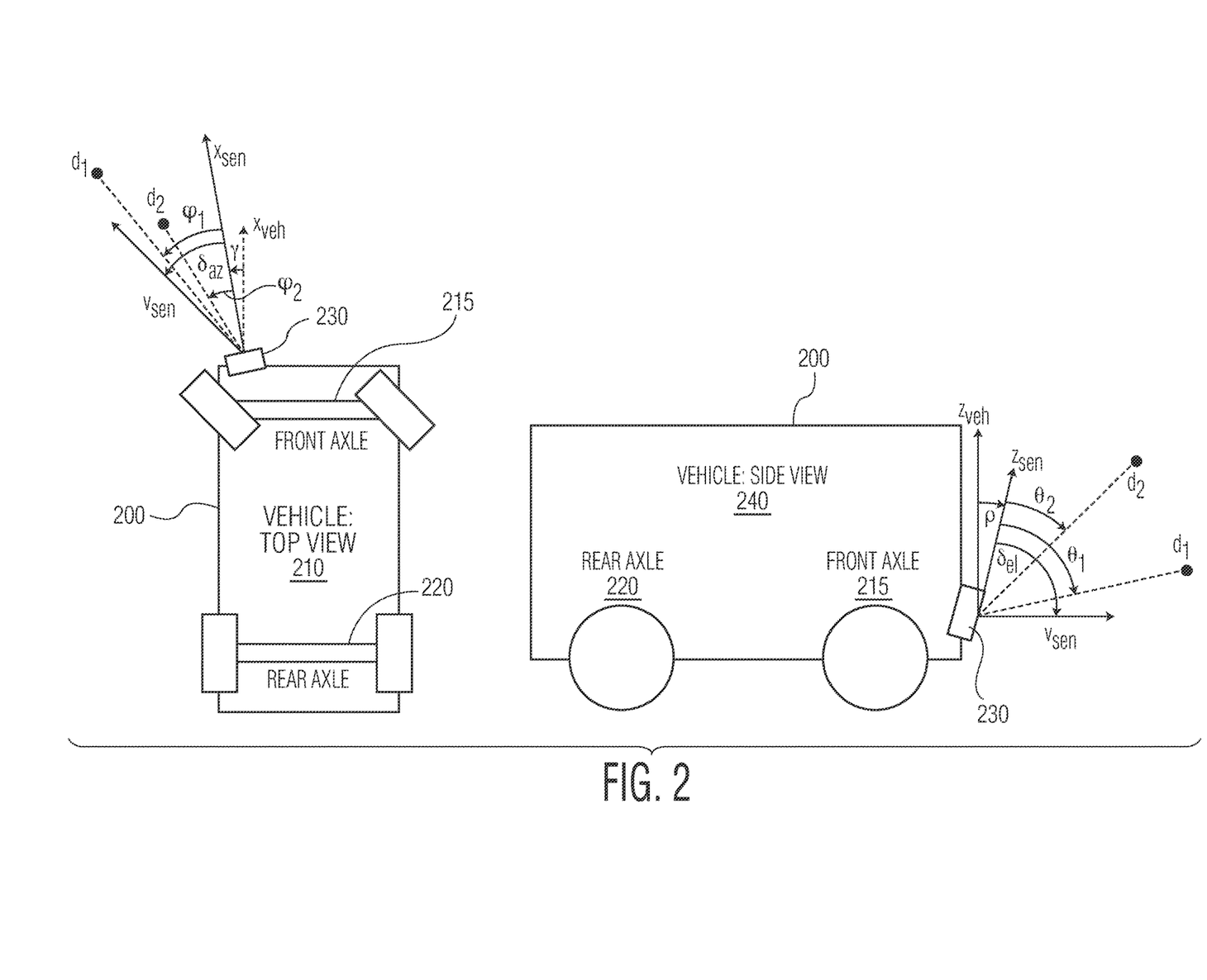
FIG. 2 is a simplified block diagram illustrating a vehicle having a mounted radar sensor.

FIG. 2 is a simplified block diagram illustrating an example of a vehicle 200 having a mounted radar sensor. Embodiments of the present invention provide a method for estimating a mounting orientation of a radar sensor on a vehicle without prior knowledge of information regarding sensor location or orientation or the need for any other sensor. Vehicle 200 is illustrated in two views: top view 210 and side view 240. The vehicle includes a front axle 215 and a rear axle 220. A radar sensor 230 is mounted to the front of vehicle 200. It should be noted that embodiments are not limited to a front mounted radar sensor or to any particular configuration of vehicle.

As illustrated, the radar sensor can be mounted with an orientation that is not necessarily aligned with the vehicle itself. $x_{veh}$ is defined as the front-facing direction of the vehicle and $z_{veh}$ is defined as the upward direction of the vehicle. $x_{sen}$ is defined as the boresight of radar sensor 230, $z_{sen}$ is defined as the upward direction of the radar sensor, and $v_{sen}$ as sensor velocity due to the movement of the vehicle. In addition, $\delta_{az}$ and $\delta_{el}$ are defined as the radar sensor heading, due to the movement of the vehicle, in azimuth and elevation. Further, $\gamma$ and $\rho$ are defined as the radar sensor mounting orientation yaw and pitch.

Radar sensor 230 generates N target detections at a given time instance. For each target detection $d_n$, where n=1,2 ... N, there is defined the detected azimuth angle $\varphi_n$, elevation angle $\theta_n$, and the radial relative velocity $v_{r,n}$. Furthermore, we define column vectors $\varphi=[\varphi_1 \ldots \varphi_N]^T$, $\theta=[\theta_1 \ldots \theta_N]^T$ and $v_r=[v_{r,1} \ldots v_{r,N}]^T$ for all targets.

Figure 3:
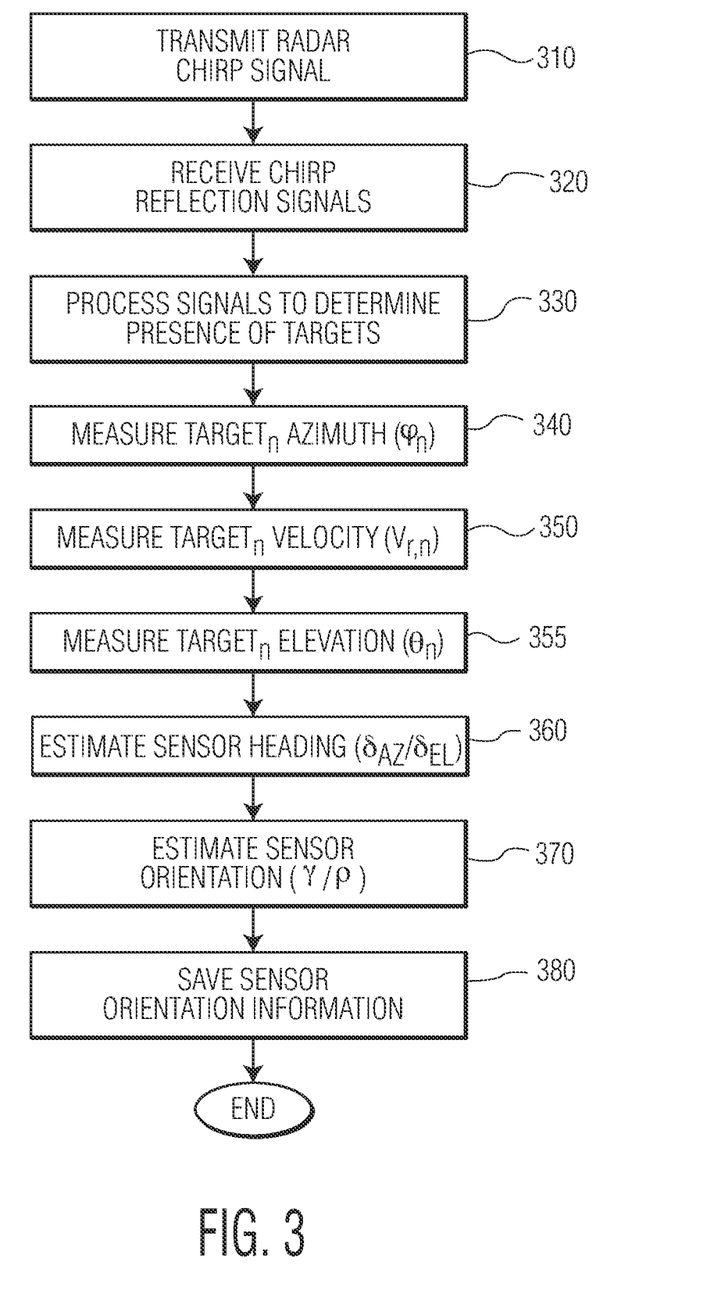
FIG. 3 is a simplified flow diagram illustrating a process flow for determining radar sensor orientation in accord with embodiments of the present invention.

FIG. 3 is a simplified flow diagram illustrating a process 300 for determining radar sensor orientation in accord with embodiments of the present invention. A radar chirp signal is transmitted by the radar system 100 (310). In a multiple-input, multiple-output radar system, a chirp signal can be transmitted by each antenna 110 during a chirp sequence interval. Chirp reflection signals can be subsequently received by one or more of receiving antennas 120 (320). The received chirp signals are then processed by radar MCU 130 to determine the presence of targets (330). Such processing can include, for example, fast Fourier transform (FFT) to determine range and doppler information, constant false alarm rate (CFAR) to determine whether a signal is representative of a physical target, and target plotting and tracking.

Once the presence of targets is determined, the information regarding the targets is further processed to measure the azimuths of each target (340) and to measure the relative velocity of each target (350). In some radar systems, there is sufficient information to also measure the elevation of each target (355). As will be discussed in greater detail below, once the target information is measured, then the target information can be used to estimate characteristics associated with the radar sensor system. The heading of the sensor system can be first determined (360). The sensor azimuthal heading ($\delta_{az}$) can be determined using the measured target azimuth and target velocity information. If the target elevation information is available, then the sensor elevation heading ($\delta_{el}$) can be determined as well. The estimated sensor heading information can be used to further estimate sensor yaw orientation ($\gamma$), and also sensor pitch orientation ($\rho$) if target elevation information is available (370). Once the sensor orientation information is determined, the information can be stored (380) for further use. The process of determining the orientation information associated with radar sensors can be performed periodically to compensate for changes in the orientation associated with the environment and can also be triggered when changes to the radar systems are performed (e.g., installation and repair).

Depending on the target information that is determinable (e.g., whether elevation information is available from the radar system), embodiments of the present invention provide varying levels of accuracy in estimating the sensor housing orientation. The most basic method estimates sensor yaw orientation and assumes that all targets have no elevation and the sensor pitch orientation is zero. This assumption can become inaccurate for high target elevation levels or a high sensor pitch. This method should be used when no target elevation information is available or when an available elevation measurement is inaccurate.

When an accurate elevation measurement is available then more sophisticated methods can be used. In one method, sensor pitch orientation continues to be assumed to be zero, but the target elevation information is used to make the sensor yaw determination more accurate. But for high sensor pitch, this method also can become inaccurate. The final method takes elevation information into account and estimates both yaw and pitch of the sensor mounting orientation. This results in the most accurate sensor orientation estimation, but, as will be discussed further below, is more computationally complex than either of the other methods.

Figure 4:
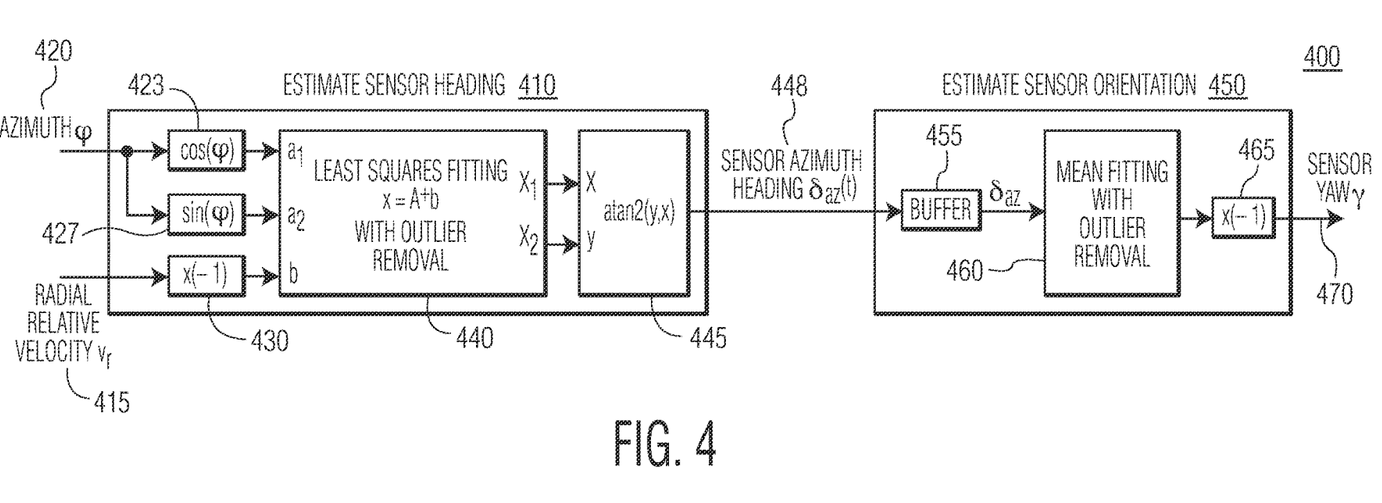
FIGS. 4, 5, and 6 are functional block diagrams illustrating example data flows associated with each method associated with embodiments of the present invention.
Figure 5:
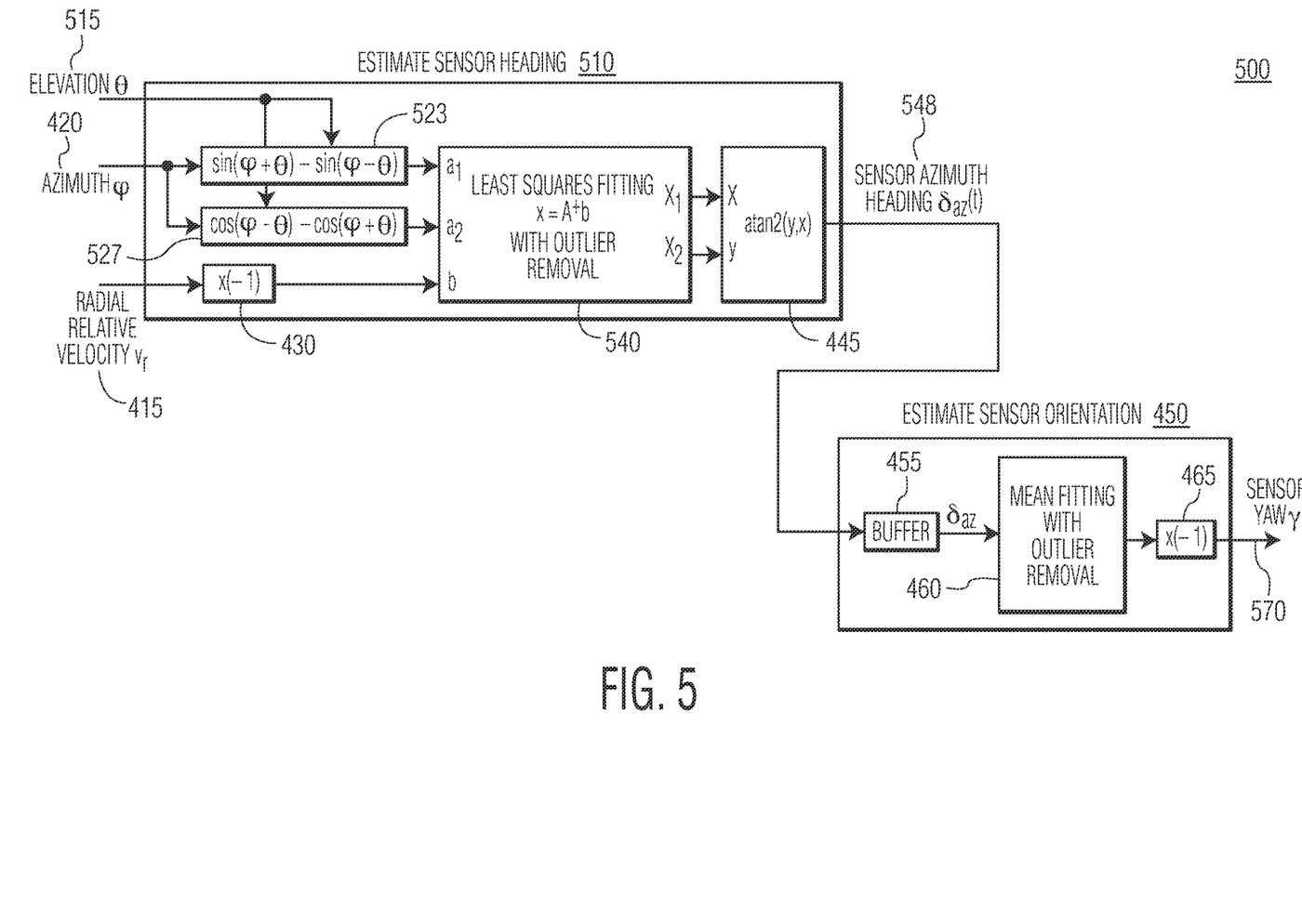
Figure 6:
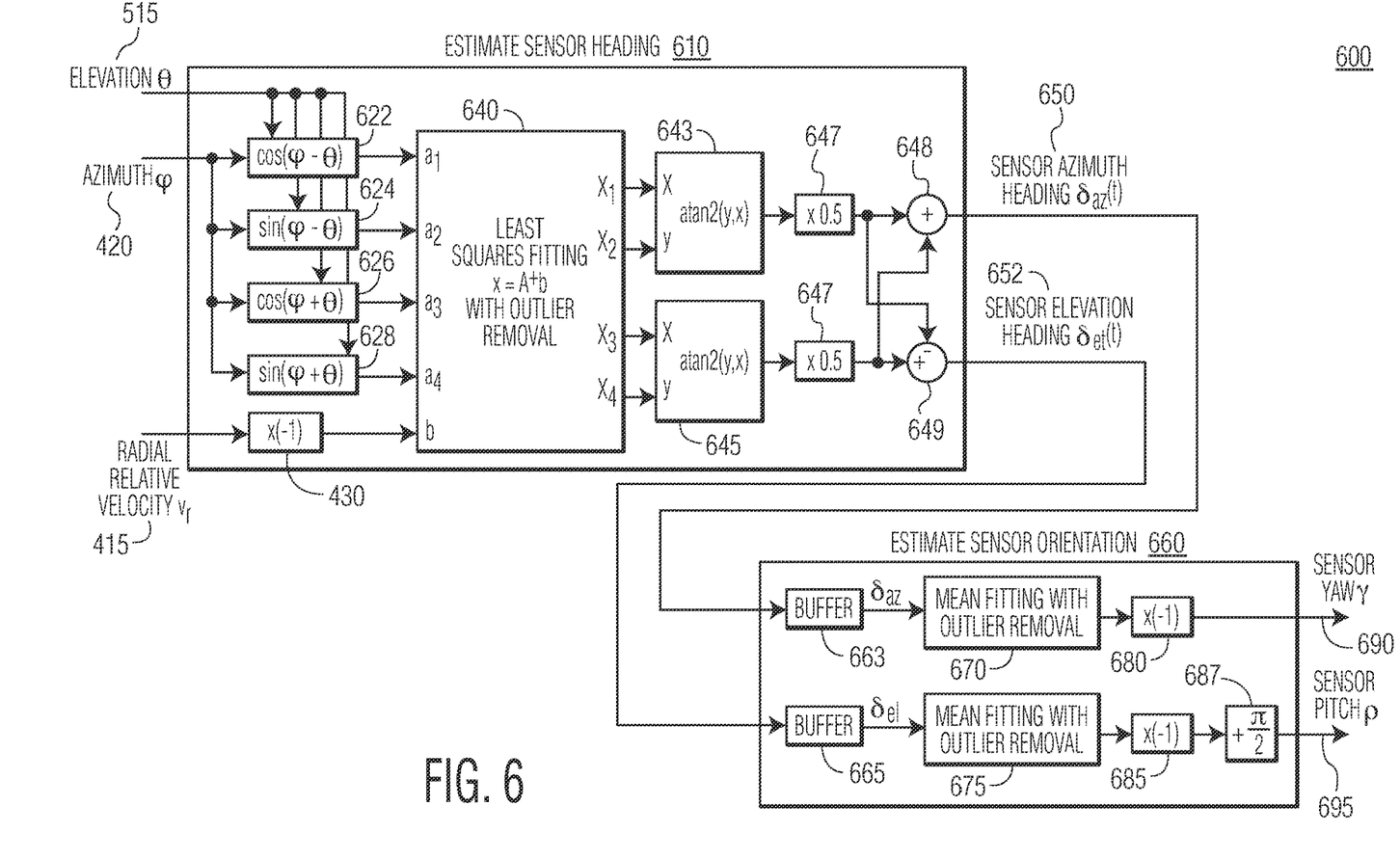

FIGS. 4, 5, and 6 are functional block diagrams illustrating example processing flows associated with each of the three methods described above, respectively, in accord with embodiments of the present invention. As illustrated with regard to FIG. 3, sensor orientation determination is performed in two parts: estimate sensor heading due to movement of the vehicle (360) and estimate sensor orientation (370). FIG. 4 illustrates those two parts of the basic method 400, where estimation of the sensor azimuth heading 410 is performed every system cycle (i.e. when a new radar detection has taken place) using the radial relative target velocities 415 and azimuth angles 420 of the radar detections, originating from stationary objects. The radial relative velocities and azimuth angles originating from non-stationary or false detections are filtered out during a fitting and outlier removal technique 440. Fitting and outlier removal technique 440 works when there are sufficient true radar detections, originating from stationary objects. When this is not the case, the sensor azimuth heading can either not be estimated (e.g., no consensus in the fitting process) or will be incorrectly estimated. In the second stage of the proposed method, estimating the sensor orientation 450, the incorrect estimations will be removed during a fitting and outlier removal process 460 which is described in the next section.

The method to estimate the sensor heading 410 is based on the following relation between the azimuth and radial relative velocity of true detections from stationary objects, the sensor azimuth heading, and the sensor velocity.

$$-v_{r,n} = v_{sen} \cdot \cos(\varphi_n - \delta_{az}) = v_{sen}\cos(\delta_{az})\cos(\varphi_n) + v_{sen}\sin(\delta_{az})\sin(\varphi_n)$$

for $n = 1, 2, \ldots N$.

The relationship assumes that the elevation of detections and the pitch orientation of the sensor is zero. The relation can be rewritten in terms of a system of linear equations:

$b = Ax$ in which:

$$b = -v_r$$

$$A = [a_1 \quad a_2] = \begin{bmatrix} \cos(\varphi_1) & \sin(\varphi_1) \\ \vdots & \vdots \\ \cos(\varphi_N) & \sin(\varphi_N) \end{bmatrix}$$

$$x = \begin{bmatrix} x_1 \\ x_2 \end{bmatrix} = \begin{bmatrix} v_{sen}\cos(\delta_{az}) \\ v_{sen}\sin(\delta_{az}) \end{bmatrix}$$

As illustrated in FIG. 4, target azimuth vector 420 is processed to provide vector cosines 423 and vector sines 427, while the target radial relative velocity vector 415 is processed to obtain the negative of the vector 430.

An approximate solution to the system of linear equations can be calculated using a least squares technique 440 for $x = A^+ b$, where $A^+$ is the Moore-Penrose pseudoinverse of $A$. Sensor azimuth heading 448 can then be determined by the following:

$$\delta_{az} = \mathrm{atan2}(x_2, x_1) \quad (445)$$

A random sampling consensus (RANSAC) method can be used to perform in conjunction with the least squares technique, which adds an outlier removal process 440. As discussed above, the method for determining sensor azimuth heading relies upon the detected targets being stationary. Thus, data points generated due to non-stationary targets are outliers that should be removed to make the sensor azimuth heading determination accurate. For the sensor azimuth heading determination, the RANSAC method is as follows:

1) Pick for $n_1$ and $n_2$ unique random integers between 1 and N.

2) Calculate $x'=A'^+b'$, where $$A' = \begin{bmatrix} \cos(\varphi_{n_1}) & \sin(\varphi_{n_1}) \\ \cos(\varphi_{n_2}) & \sin(\varphi_{n_2}) \end{bmatrix} \text{ and } b' = \begin{bmatrix} v_{r,n_1} \\ v_{r,n_2} \end{bmatrix}$$

3) Determine the error as follows $$e = \begin{bmatrix} e_1 \\ \vdots \\ e_N \end{bmatrix} = \text{abs}(Ax' - b)$$

where abs(.) calculates the absolute value of each vector element.

4) Determine the inliers set I that consist of all n for which $e_n$<MAX_INLIER_ERROR 5) When the number of inliers, i.e. |I| (the number of elements in I), is greater or equal than MIN_NUMBER_OF_INLIERS, continue to step 6. When this condition is not true, repeat steps 1 to 5 until this condition is met or the number of iterations reaches MAX_NUMBER_OF_ITERATIONS. When the maximum number of iterations is reached without meeting the condition, no sensor heading will be output in this system cycle.

6) Calculate $x''=A''^+b''$ (x" will be output as x in FIG. 6), where $$A'' = \begin{bmatrix} \cos(\varphi_{I_1}) & \sin(\varphi_{I_1}) \\ \vdots & \vdots \\ \cos(\varphi_{I_{|I|}}) & \sin(\varphi_{I_{|I|}}) \end{bmatrix} \text{ and } b'' = \begin{bmatrix} v_{r,I_1} \\ \vdots \\ v_{r,I_{|I|}} \end{bmatrix}$$

In the above random sampling method, the parameters MAX_INLIER_ERROR, MIN_NUMBER_OF_INLIERS, and MAX_NUMBER_OF_ITERATIONS are predetermined in light of the characteristics of the radar sensor and are defined as follows:

MAX_INLIER_ERROR: defines the maximum error to include a detection in the inlier set.

MIN_NUMBER_OF_INLIERS: defines the minimum number of inliers to accept the consensus. Can be a fixed number, or a percentage of the total number of detections N or both.

MAX_NUMBER_OF_ITERATIONS: defines the maximum iterations to reach to a consensus.

Embodiments can provide an additional quality check on the evaluation of the sensor azimuth heading in order to ensure accuracy. Such a check can include, for example, determining whether the span of the azimuth of inliers is larger than a predetermined value or determining whether the span of the radial velocity of inliers is larger than a predetermined value.

The resulting vector from least squares fitting and outlier removal process 440 is provided to atan2 process 445 to obtain sensor azimuth heading 448. Once sensor azimuth heading 448 is determined, estimating sensor orientation 450 is performed using the sensor azimuth heading. Over a set number of cycles K, the sensor azimuth heading estimations of multiple cycles are placed in a buffer 455. The K estimations can be collected from consecutive or non-consecutive cycles (e.g., by random sampling or at a fixed interval).

When a vehicle drives straight, the radar sensor yaw mounting orientation equals the negative azimuth heading: $\gamma=-\delta_{az}$. Therefore, a mean value of the buffered sensor azimuth estimations multiplied by minus one (465) can be used to estimate the yaw 470 when the vehicle was approximately driving straight. Furthermore, a fitting and outlier removal technique 460 is performed to remove incorrect azimuth heading estimations (as explained with regard to fitting process 440, above) and also estimations when the vehicle was not approximately driving straight. This results in negative mean value of all correctly estimated azimuth headings, when the car was approximately driving straight, which approximates the sensor yaw mounting orientation.

This method works when a straight heading of the vehicle is the most common result within the buffered headings. In typical usage, this will be the likely result due to the following:

Most parts of roads are straight, approximately straight, or approximately straight on average.

Small corrective steering actions of the vehicle are in both directions and cancel out on average. (Larger steering actions can be filtered out during the outlier removal process when consensus is reached, as discussed below.)

Vehicles tend to drive from A to B and not in circles. If the vehicle is driving with a heading that is always positive or always negative, then the vehicle drives in circles.

In those scenarios when the above is not the case, then no consensus will be found and MAX_NUMBER_OF_ITERATIONS (discussed in greater detail below) will be reached. In such a case, no erroneous estimation will be output and a new estimation, based on new buffered sensor headings, can be initiated. By increasing MIN_NUMBER_OF_INLIERS (discussed in greater detail below), the chance to reach an incorrect consensus can be reduced.

Mean fitting with outlier removal 460 can be implemented using a random sampling consensus (RANSAC) method as follows:

1) Pick for $k_1$ a random integer between 1 and K.

2) Determine the error as follows $$e = \begin{bmatrix} e_1 \\ \vdots \\ e_N \end{bmatrix} = \text{abs}(\delta_{az} - \delta_{az,k_1})$$

where abs calculates the absolute value of each vector element.

3) Determine the inliers set I that consist of all k for which $e_k$<MAX_INLIER_ERROR 4) When the number of inliers, i.e. |I| (the number of elements in I), is greater or equal than MIN_NUMBER_OF_INLIERS, continue to step 5. When this condition is not true, repeat steps 1 to 4 until this condition is met or the number of iterations reaches MAX_NUMBER_OF_ITERATIONS. When the maximum number of iterations is reached without meeting the condition, the estimation of the sensor orientation has failed, but no erroneous estimation will be output.

5) Calculate the output result:

$$\gamma = -\frac{\Sigma_{k \in I} \delta_{az,k}}{|I|}$$

In the above random sampling method, the parameters MAX_INLIER_ERROR, MIN_NUMBER_OF_INLIERS, and MAX_NUMBER_OF_ITERATIONS are predetermined in light of the characteristics of the radar sensor and are defined as follows:

MAX_INLIER_ERROR: defines the maximum error to include a detection in the inlier set.

MIN_NUMBER_OF_INLIERS: defines the minimum number of inliers to accept the consensus. Can be a fixed number, or a percentage of the buffer length K or both.

MAX_NUMBER_OF_ITERATIONS: Parameter that defines the maximum iterations to reach a consensus.

It should be noted that, for mean fitting with outlier removal 460, these parameters do not necessarily have the same value as those parameters associated with least squares fitting with outlier removal 440 that is part of the estimate sensor heading process 410.

In order to reduce the chances of outliers due to non-straight vehicle travel, buffering of the K sensor heading estimations can be triggered using an external trigger signal. The external trigger signal can be provided by, for example, a sensor determining when the steering wheels of the vehicle are straight, or near straight, or a signal provided during a factory-environment calibration process. In this way, the estimation of sensor orientation can be improved by an external system that has more information regarding the environment of the vehicle and can better define those instances in which better estimations can be provided.

FIG. 5 illustrates a method 500 that is similar to that of method 400 but can provide enhanced accuracy of the sensor orientation by taking into account target elevation angles 515 in addition to radial relative target velocities 415 and target azimuth angles 420. The method to estimate the sensor heading 510 is based on the following relation between the azimuth, radial relative velocity, and elevation of true detections from stationary objects, the sensor azimuth heading, and the sensor velocity.

$$-v_{r,n} = v_{sen} \cdot \cos(\varphi_n - \delta_{az}) \cdot \sin(\theta_n)$$

for n=1, 2, ... N.

This relationship still assumes that the pitch orientation of the sensor is zero. The least squares fitting with outlier removal process 540 and the atan2 operation 445 remain the same, but with the different set of linear equations associated with the above relationship.

$$A = [a_1 \ a_2] =$$

$$\begin{bmatrix} \sin(\varphi_1 + \theta_1) - \sin(\varphi_1 - \theta_1) & \cos(\varphi_1 - \theta_1) - \cos(\varphi_1 + \theta_1) \\ \vdots & \vdots \\ \sin(\varphi_N + \theta_N) - \sin(\varphi_N - \theta_N) & \cos(\varphi_N - \theta_N) - \cos(\varphi_N + \theta_N) \end{bmatrix}$$

$$A' = \begin{bmatrix} \sin(\varphi_{n_1} + \theta_{n_1}) - \sin(\varphi_{n_1} - \theta_{n_1}) & \cos(\varphi_{n_1} - \theta_{n_1}) - \cos(\varphi_{n_1} + \theta_{n_1}) \\ \sin(\varphi_{n_2} + \theta_{n_2}) - \sin(\varphi_{n_2} - \theta_{n_2}) & \sin(\varphi_{n_2} + \theta_{n_2}) - \sin(\varphi_{n_2} - \theta_{n_2}) \end{bmatrix}$$

$$A'' = \begin{bmatrix} \sin(\varphi_{I_1} + \theta_{I_1}) - \sin(\varphi_{I_1} - \theta_{I_1}) & \cos(\varphi_{I_1} - \theta_{I_1}) - \cos(\varphi_{I_1} + \theta_{I_1}) \\ \vdots & \vdots \\ \sin(\varphi_{I_{|I|}} + \theta_{I_{|I|}}) - \sin(\varphi_{I_{|I|}} - \theta_{I_{|I|}}) & \cos(\varphi_{I_{|I|}} - \theta_{I_{|I|}}) - \cos(\varphi_{I_{|I|}} + \theta_{I_{|I|}}) \end{bmatrix}$$

As illustrated in FIG. 5, target azimuth vector 420 and target elevation vector 515 are processed to provide vector relationships 523 and 527, while target radial relative velocity vector 415 is processed to obtain the negative of the vector 430. These vectors are provided to and processed by least squares fitting with outlier removal process 540. The resulting vector is processed by atan2 to obtain sensor azimuth heading 548. The rest of the process to estimate sensor orientation 450 is the same as that described for FIG. 4.

FIG. 6 illustrates a method 600 that is similar to that of method 500 but also estimates sensor elevation heading 652, along with sensor azimuth heading 650, during estimate sensor heading process 610. Determination of sensor elevation heading 652 allows for a subsequent determination of sensor pitch 695 while estimating sensor orientation 660.

The method to estimate sensor heading 610 is based on the following relation between the azimuth, elevation, radial relative velocity, and elevation of true detections from stationary objects, sensor heading, and sensor velocity.

$$-v_{r,n} = v_{sen} \cdot \cos(\varphi_n - \delta_{az}) \cdot \cos(\theta_n - \delta_{el})$$

for n=1, 2, ... N. In light of this relationship, the set of linear equations is as follows.

$$A = [a_1 \ a_2 \ a_3 \ a_4] =$$

$$\begin{bmatrix} \cos(\varphi_1 - \theta_1) & \sin(\varphi_1 - \theta_1) & \cos(\varphi_1 + \theta_1) & \sin(\varphi_1 + \theta_1) \\ \vdots & \vdots & \vdots & \vdots \\ \cos(\varphi_N - \theta_N) & \sin(\varphi_N - \theta_N) & \cos(\varphi_N + \theta_N) & \sin(\varphi_N + \theta_N) \end{bmatrix}$$

$$A' = \begin{bmatrix} \cos(\varphi_{n_1} - \theta_{n_1}) & \sin(\varphi_{n_1} - \theta_{n_1}) & \cos(\varphi_{n_1} + \theta_{n_1}) & \sin(\varphi_{n_1} + \theta_{n_1}) \\ \vdots & \vdots & \vdots & \vdots \\ \cos(\varphi_{n_4} - \theta_{n_4}) & \sin(\varphi_{n_4} - \theta_{n_4}) & \cos(\varphi_{n_4} + \theta_{n_4}) & \sin(\varphi_{n_4} + \theta_{n_4}) \end{bmatrix}$$

$$A'' = \begin{bmatrix} \cos(\varphi_{I_1} - \theta_{I_1}) & \sin(\varphi_{I_1} - \theta_{I_1}) & \cos(\varphi_{I_1} + \theta_{I_1}) & \sin(\varphi_{I_1} + \theta_{I_1}) \\ \vdots & \vdots & \vdots & \vdots \\ \cos(\varphi_{I_{|I|}} - \theta_{I_{|I|}}) & \sin(\varphi_{I_{|I|}} - \theta_{I_{|I|}}) & \cos(\varphi_{I_{|I|}} + \theta_{I_{|I|}}) & \sin(\varphi_{I_{|I|}} + \theta_{I_{|I|}}) \end{bmatrix}$$

$$x = \begin{bmatrix} x_1 \\ x_2 \\ x_3 \\ x_4 \end{bmatrix} \quad b' = \begin{bmatrix} v_{r,n_1} \\ \vdots \\ v_{r,n_4} \end{bmatrix}$$

As illustrated in FIG. 6, target azimuth vector 420 and target elevation vector 515 are processed to provide vector relationships 622, 624, 626, and 628, while target radial relative velocity vector 415 is processed to obtain the negative of the vector 430.

As with methods 400 and 500, a RANSAC method is used to perform the least squares technique with outlier removal process 640. This process is substantially the same as that described for FIGS. 4 and 5 with the exception that step one is:

1) Pick for $n_1$, $n_2$, $n_3$ and $n_4$ unique random integers between 1 and N.

The atan2 operation is modified to perform atan2 between $x_1$ and $x_2$ (643) and atan2 between $x_3$ and $x_4$ (645). The results of the atan2 operations are then halved (647) and combined (648 and 649) to generate sensor azimuth heading 650 and sensor elevation heading 652.

Estimating the sensor orientation 660 is modified to calculate not only the sensor yaw 690, but also the sensor pitch 695. Calculation of sensor yaw 690 is the same as that illustrated for FIGS. 4 and 5 (buffering of the azimuth headings over a time interval 663, mean fitting with outlier removal 670, and taking the negative of the result of the fitting 680).

Sensor pitch orientation 695 is estimated from sensor elevation heading 652 in a similar fashion. The mean fitting with outlier removal process is reused (675), with modifications as listed below.

1) Pick for $k_1$ a random integer between 1 and K.
2) Determine the error as follows $$e = \begin{bmatrix} e_1 \\ \vdots \\ e_N \end{bmatrix} = \text{abs}(\delta_{el} - \delta_{el,k_1})$$

where abs calculates the absolute value of each vector element.
3) Determine the inliers set I that consist of all k for which $e_k$<MAX_INLIER_ERROR
4) When the number of inliers, i.e. |I| (the number of elements in I), is greater or equal than MIN_NUM-BER_OF_INLIERS, continue to step 5. When this condition is not true, repeat steps 1 to 4 until this condition is met or the number of iterations reaches MAX_NUMBER_OF_ITERATIONS. When the maximum number of iterations is reached without meeting the condition, the estimation of the sensor orientation has failed, but no erroneous estimation will be output.
5) Calculate the output result:

$$\rho = \frac{\pi}{2} - \frac{\Sigma_{k \in I} \delta_{el,k}}{|I|}$$

The processing subsequent to mean fitting and outlier removal 675 are in accord with step 5 (685 and 687).

Embodiments of the present invention can be applied to estimate sensor orientation of automotive radar sensors that are capable of providing at least azimuth angle and radial relative velocity of target detections. For more accurate sensor orientation determination (e.g., methods 500 and 600), the radar sensors also should be capable of providing target elevation angle. Sensors can use one or multiple transceivers and processing can be performed by a microcontroller unit associated with the radar sensor. When multiple radar sensors are mounted on a vehicle, embodiments can be used to separately determine the orientation of each sensor.

By now, it should be appreciated that there has been provided a radar system that includes radar transmitters, radar receivers, and a radar microcontroller unit coupled to the radar transmitters and radar receivers. The radar MCU is configured to transmit a set of chirp signals from the radar transmitters, receive signals by one or more of the radar receivers that are reflected from one or more targets where the one or more targets are in previously unknown locations relative to the radar transmitters and radar receivers, measure an azimuth for each of the one or more targets from the reflected signals, measure a radial relative velocity for each one of the one or more targets from the reflected signals, determine a sensor azimuth heading using the azimuths and radial relative velocities of the one or more targets, and determine a sensor yaw orientation using a set of sensor azimuth headings over a time period.

In one aspect of the above embodiment, the radar MCU is configured to determine the sensor azimuth heading by being further configured to solve for $\delta_{az}$ a set of linear equations associated with $$-v_{r,n} = v_{sen} \cdot \cos(\varphi_n - \delta_{az})$$

using a least squares technique, and remove outlier data associated with non-stationary targets of the one or more targets prior to solving for $\delta_{az}$. In a further aspect, the radar MCU is configured to remove the outlier data by being further configured to determine a derivative of each azimuth where an error is an absolute value of the derivative and an outlier azimuth is associated with an error larger than a predetermined threshold.

In another aspect, the radar MCU is configured to determine the sensor yaw orientation by being further configured to store the set of sensor azimuth heading values over the time period, discard sensor azimuth values having an error greater than a predetermined threshold where the error includes a departure from a mean value of the sensor azimuth values, and determine the sensor yaw orientation using non-discarded the sensor azimuth values from the set of sensor azimuth values when a number of non-discarded sensor azimuth values is greater than a predetermined threshold of total sensor azimuth values. In another aspect of the above embodiment, the radar MCU is further configured to measure an elevation for each of the one or more targets from the reflected signals, and perform the determining of the sensor azimuth heading also using the elevations of the one or more targets. In a further aspect, the radar MCU is configured to determine the sensor azimuth heading by being further configured to solve for $\delta_{az}$ a set of linear equations associated with $$-v_{r,n} = v_{sen} \cdot \cos(\varphi_n - \delta_{az}) \cdot \sin(\theta_n)$$

using a least squares technique where $\delta_{az}$ is the sensor azimuth heading, and remove outlier data associated with non-stationary targets of the one or more targets prior to solving for $\delta_{az}$.

In yet another aspect, the radar MCU is further configured to measure an elevation for each of the one or more targets from the reflected signals, perform the determining of the sensor azimuth heading also using the elevations of the one or more targets, and determine a sensor elevation heading, using the elevations, the azimuths, and the radial relative velocities of the one or more targets. In a further aspect, the radar MCU is configured to determine the sensor azimuth heading and the sensor elevation heading by being further configured to solve for $\delta_{az}$ and $\delta_{el}$ a set of linear equations associated with $$-v_{r,n} = v_{sen} \cdot \cos(\varphi_n - \delta_{az}) \cdot \cos(\theta_n - \delta_{el})$$

using a least squares technique, wherein $\delta_{az}$ is the sensor azimuth heading and $\delta_{el}$ is the sensor elevation heading, and remove outlier data associated with non-stationary targets of the one or more targets prior to solving for $\delta_{az}$ and $\delta_{el}$. In still a further aspect, the radar MCU is further configured to determine a sensor picture orientation using a set of sensor elevation headings over the time period.

Another embodiment provides a method for determining an automotive radar sensor orientation. The method includes transmitting a set of chirp signals from a plurality of radar transmitters, receiving signals by one or more of a plurality of radar receivers that are reflected from one or more targets where the one or more targets are located in previously unknown locations relative to the radar transmitters and radar receivers, measuring an azimuth for each of the one or more targets from the reflected signals, measuring a radial relative velocity for each of the one or more targets from the reflected signals, determining a radar sensor azimuth heading using the azimuths and radial relative velocities of the one or more targets, and determining a radar sensor yaw orientation using a set of sensor azimuth headings over a time period.

In one aspect of the above embodiment, determining the radar sensor azimuth heading further includes solving, for $\delta_{az}$, a set of linear equations associated with $$-v_{r,n}=v_{sen}\cdot\cos(\varphi_n-\delta_{az})$$

using a least squares technique, and removing outlier data associated with non-stationary targets of the one or more targets prior to solving for $\delta_{az}$. In yet a further aspect, removing the outlier data further includes determining a derivative of each azimuth where an error is an absolute value of the derivative, and an outlier azimuth is associated with an error larger than a predetermined threshold.

In another aspect of the above embodiment, determining the radar sensor yaw orientation further includes storing the set of sensor azimuth heading values over the time period, discarding sensor azimuth values having an error greater than a predetermined threshold where the error includes a departure from a mean value of the sensor azimuth values, and determining the sensor yaw orientation using non-discarded sensor azimuth values from the set of sensor azimuth values when a number of non-discarded sensor azimuth values is greater than a predetermined threshold of total sensor azimuth values.

In another aspect the method further includes measuring an elevation for each of the one or more targets from the reflected signals, and performing the determining of the sensor azimuth heading also using the elevations of the one or more targets. In a further aspect, determining the radar sensor azimuth heading, $\delta_{az}$, further includes solving, for $\delta_{az}$, a set of linear equations associated with $$-v_{r,n}=v_{sen}\cdot\cos(\varphi_n-\delta_{az})\cdot\sin(\theta_n)$$

using a least squares technique, and removing outlier data associated with non-stationary targets of the one or more targets prior to solving for $\delta_{az}$.

In yet another aspect, the method further includes measuring an elevation for each of the one or more targets from the reflected signals, and performing the determining of the radar sensor azimuth heading also using the elevations of the one or more targets, and determining a radar sensor elevation heading using the elevations, the azimuths, and the radial relative velocities of the one or more targets. In a further aspect, determining the radar sensor azimuth heading and the radar sensor elevation heading further include solving for $\delta_{az}$ and $\delta_{el}$ a set of linear equations associated with $$-v_{r,n}=v_{sen}\cdot\cos(\varphi_n-\delta_{az})\cdot\cos(\theta_n-\delta_{el})$$

using a least squares technique, wherein $\delta_{az}$ is the sensor azimuth heading and $\delta_{el}$ is the sensor elevation heading, and removing outlier data associated with non-stationary targets of the one or more targets prior to solving for $\delta_{az}$ and $\delta_{el}$. In yet a further aspect, the method further includes determining a sensor picture orientation using a set of sensor elevation headings over the time period.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different radar systems. For example, although FIG. 1 and the discussion thereof describe an exemplary radar system architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of radar system 100 are circuitry located on a single integrated circuit or within a same device. Alternatively, radar system 100 can include any number of separate integrated circuits or separate devices interconnected with each other. For example, radar transmitters 110 and radar receivers 120 may be located on a same integrated circuit as radar MCU 130 or on a separate integrated circuit or located within another peripheral or slave discretely separate from other elements of radar system 100.

Furthermore, those skilled in the art will recognize that boundaries between the functionality of the above-described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of radar system 100, for example, from computer readable media such as memory 150 or other media on other computer systems. Such computer readable media may be permanently, removably or remotely coupled to radar system 100. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; M RAM; volatile storage media including registers, buffers or caches, main memory, RAM, etc.; and data transmission media including computer networks, point-to-point telecommunication equipment, and carrier wave transmission media, just to name a few.

A processor (e.g., processor 140) processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, radar system 100 can have varying numbers of radar transmitters and radar receivers. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A radar system comprising:
a plurality of radar transmitters;
a plurality of radar receivers; and
a radar microcontroller unit (MCU), coupled to the plurality of radar transmitters and the plurality of radar receivers, and configured to transmit a set of chirp signals from the plurality of radar transmitters, receive signals, by one or more of the plurality of radar receivers, reflected from one or more targets wherein the one or more targets are in previously unknown locations relative to the radar transmitters and radar receivers, measure an azimuth for each of the one or more targets from the reflected signals, measure a radial relative velocity for each of the one or more targets from the reflected signals, determine a sensor azimuth heading using the azimuths and radial relative velocities of the one or more targets, and determine a sensor yaw orientation using a set of sensor azimuth headings over a time period.

2. The radar system of claim 1 wherein the radar MCU is configured to determine the sensor azimuth heading by being further configured to:

solve, for $\delta_{az}$, a set of linear equations associated with $$-v_{r,n} = v_{sen} \cdot \cos(\varphi_n - \delta_{az})$$

using a least squares technique, where $\delta_{az}$ represents the sensor azimuth heading, $v_{r,n}$ represents relative radial velocity, $v_{sen}$ represents sensor velocity, and $\varphi_n$ represents detected azimuth angle; and remove outlier data associated with non-stationary targets of the one or more targets prior to solving for $\delta_{az}$.

3. The radar system of claim 2 wherein the radar MCU is configured to remove the outlier data by being further configured to:

determine a derivative of each azimuth, wherein
an error is an absolute value of the derivative, and
an outlier azimuth is associated with an error larger than a predetermined threshold.

4. The radar system of claim 1 wherein the radar MCU is configured to determine the sensor yaw orientation by being further configured to:

store the set of sensor azimuth heading values over the time period;

discard sensor azimuth values having an error greater than a predetermined threshold, wherein the error comprises a departure from a mean value of the sensor azimuth values; and determine the sensor yaw orientation using non-discarded sensor azimuth values from the set of sensor azimuth values when a number of non-discarded sensor azimuth values is greater than a predetermined threshold of total sensor azimuth values.

5. The radar system of claim 1 wherein the radar MCU is further configured to:

measure an elevation for each of the one or more targets from the reflected signals; and perform said determining the sensor azimuth heading also using the elevations of the one or more targets.

6. The radar system of claim 5 wherein the radar MCU is configured to determine the sensor azimuth heading by being further configured to:

solve, for $\delta_{az}$, a set of linear equations associated with $$-v_{r,n} = v_{sen} \cdot \cos(\varphi_n - \delta_{az}) \cdot \sin(\theta_n)$$

using a least squares technique, wherein $\delta_{az}$ is the sensor azimuth heading, $v_{r,n}$ represents relative radial velocity, $v_{sen}$ represents sensor velocity, $\varphi_n$ represents detected azimuth angle, and $\theta_n$ represents elevation angle; and remove outlier data associated with non-stationary targets of the one or more targets prior to solving for $\delta_{az}$.

7. The radar system of claim 1 wherein the radar MCU is further configured to:
measure an elevation for each of the one or more targets from the reflected signals;
perform said determining the sensor azimuth heading, $\delta_{az}$, also using the elevations of the one or more targets; and
determine a sensor elevation heading, $\delta_{el}$, using the elevations, the azimuths, and the radial relative velocities of the one or more targets.

8. The radar system of claim 7 wherein the radar MCU is configured to determine the sensor azimuth heading and the sensor elevation heading by being further configured to:
solve, for $\delta_{az}$ and $\delta_{el}$, a set of linear equations associated with $$-v_{r,n} = v_{sen} \cdot \cos(\varphi_n - \delta_{az}) \cdot \cos(\theta_n - \delta_{el})$$

using a least squares technique, wherein $\delta_{az}$ is the sensor azimuth heading, $-\delta_{el}$ is the sensor elevation heading, $v_{r,n}$ represents relative radial velocity, $v_{sen}$ represents sensor velocity, $\varphi_n$ represents detected azimuth angle and $\theta_n$ represents elevation angle; and
remove outlier data associated with non-stationary targets of the one or more targets prior to solving for $\delta_{az}$ and $\delta_{el}$.

9. The radar system of claim 8 wherein the radar MCU is further configured to:
determine a sensor pitch orientation using a set of sensor elevation headings over the time period.

10. A method for determining an automotive radar sensor orientation, the method comprising:
transmitting a set of chirp signals from a plurality of radar transmitters;
receiving signals, by one or more of a plurality of radar receivers, reflected from one or more targets, wherein the one or more targets are located in previously unknown locations relative to the radar transmitters and radar receivers;
measuring an azimuth for each of the one or more targets from the reflected signals;
measuring a radial relative velocity for each of the one or more targets from the reflected signals;
determining a radar sensor azimuth heading, $\delta_{az}$, using the azimuths and radial relative velocities of the one or more targets; and
determining a radar sensor yaw orientation using a set of sensor azimuth headings over a time period.

11. The method of claim 10 wherein said determining the radar sensor azimuth heading, $\delta_{az}$, further comprises:
solving, for $\delta_{az}$, a set of linear equations associated with $$-v_{r,n} = v_{sen} \cdot \cos(\varphi_n - \delta_{az})$$

using a least squares technique, where $v_{r,n}$ represents relative radial velocity, $v_{sen}$ represents sensor velocity, and $\varphi_n$, represents detected azimuth angle; and
removing outlier data associated with non-stationary targets of the one or more targets prior to solving for $\delta_{az}$.

12. The method of claim 11 wherein removing the outlier data further comprises:
determining a derivative of each azimuth, wherein an error is an absolute value of the derivative, and an outlier azimuth is associated with an error larger than a predetermined threshold.

13. The method of claim 10 wherein said determining the radar sensor yaw orientation further comprises:
storing the set of sensor azimuth heading values over the time period;
discarding sensor azimuth values having an error greater than a predetermined threshold, wherein the error comprises a departure from a mean value of the sensor azimuth values; and
determining the sensor yaw orientation using non-discarded sensor azimuth values from the set of sensor azimuth values when a number of non-discarded sensor azimuth values is greater than a predetermined threshold of total sensor azimuth values.

14. The method of claim 10 further comprising:
measuring an elevation for each of the one or more targets from the reflected signals; and
performing said determining the sensor azimuth heading also using the elevations of the one or more targets.

15. The method of claim 14 wherein said determining the radar sensor azimuth heading, $\delta_{az}$, further comprises:
solving, for $\delta_{az}$, a set of linear equations associated with $$-v_{r,n} = v_{sen} \cdot \cos(\varphi_n - \delta_{az}) \cdot \sin(\theta_n)$$

using a least squares technique, where $v_{r,n}$ represents relative radial velocity, $v_{sen}$ represents sensor velocity, $\varphi_n$ represents detected azimuth angle, and $\theta_n$ represents elevation angle; and
removing outlier data associated with non-stationary targets of the one or more targets prior to solving for $\delta_{az}$.

16. The method of claim 10 further comprising:
measuring an elevation for each of the one or more targets from the reflected signals;
performing said determining the radar sensor azimuth heading, $\delta_{az}$, also using the elevations of the one or more targets; and
determining a radar sensor elevation heading, $\delta_{el}$, using the elevations, the azimuths, and the radial relative velocities of the one or more targets.

17. The method of claim 16 wherein said determining the radar sensor azimuth heading, $\delta_{az}$, and the radar sensor elevation heading, $\delta_{el}$, further comprises:
solving for $\delta_{az}$ and $\delta_{el}$, in a set of linear equations associated with $$-v_{r,n} = v_{sen} \cdot \cos(\varphi_n - \delta_{az}) \cdot \cos(\theta_n - \delta_{el})$$

using a least squares technique where $v_{r,n}$ represents relative radial velocity, $v_{sen}$ represents sensor velocity, $\varphi_n$, represents detected azimuth angle, and $\theta_n$ represents elevation angle; and
removing outlier data associated with non-stationary targets of the one or more targets prior to solving for $\delta_{az}$ and $\delta_{el}$.

18. The method of claim 17 further comprising:
determining a sensor pitch orientation using a set of sensor elevation headings over the time period.

* * * * *